(12) United States Patent
Biermann et al.

(10) Patent No.: US 7,114,934 B2
(45) Date of Patent: Oct. 3, 2006

(54) STRUCTURE INCLUDING A PLURALITY OF CELLS OF CURED RESINOUS MATERIAL, METHOD OF FORMING THE STRUCTURE AND APPARATUS FOR FORMING THE STRUCTURE

(75) Inventors: Paul J. Biermann, Columbia, MD (US); Jack C. Roberts, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 229 days.

(21) Appl. No.: 10/677,692

(22) Filed: Oct. 2, 2003

(65) Prior Publication Data
US 2004/0067271 A1   Apr. 8, 2004

Related U.S. Application Data

(62) Division of application No. 09/979,575, filed as application No. PCT/US01/11170 on Apr. 4, 2001, now abandoned.

(60) Provisional application No. 60/196,027, filed on Apr. 7, 2000.

(51) Int. Cl.
*B29C 44/02* (2006.01)

(52) U.S. Cl. ............... 425/4 R; 425/7; 425/174.4

(58) Field of Classification Search ............ 425/7, 425/4 R, 174.4, 174.8 R; 264/572, 576
See application file for complete search history.

(56) References Cited

U.S. PATENT DOCUMENTS

| | | | |
|---|---|---|---|
| 3,423,489 A | 1/1969 | Arens et al. | 264/4 |
| 4,303,603 A * | 12/1981 | Torobin | 264/69 |
| 5,125,979 A * | 6/1992 | Swain et al. | 134/7 |
| 5,274,006 A | 12/1993 | Kagoshima et al. | 521/85 |
| 5,445,509 A * | 8/1995 | Allen et al. | 425/72.2 |
| 5,476,616 A * | 12/1995 | Schwarz | 264/6 |
| 6,361,720 B1 * | 3/2002 | Highsmith | 264/7 |
| 6,364,647 B1 * | 4/2002 | Sanborn | 425/7 |
| 2004/0131713 A1* | 7/2004 | Dzialas et al. | 425/7 |

FOREIGN PATENT DOCUMENTS

EP    0500 009 A1    2/1992

* cited by examiner

*Primary Examiner*—Joseph S. Del Sole
*Assistant Examiner*—Emmanuel S. Luk
(74) *Attorney, Agent, or Firm*—Benjamin Y. Roca

(57) ABSTRACT

A structure that includes a plurality of cells of a cured resinous material. Each cell is joined to at least one other cell.

1 Claim, 13 Drawing Sheets

STRUCTURE INCLUDING A PLURALITY OF CELLS OF CURED RESINOUS MATERIAL, METHOD OF FORMING THE STRUCTURE AND APPARATUS FOR FORMING THE STRUCTURE

CROSS-REFERENCE TO RELATED APPLICATIONS

This application is a divisional of U.S. application Ser. No. 09/979,575 filed Nov. 6, 2001 now abandoned which is a 371 and claims benefit of International Application No. PCT/US01/11170, filed Apr. 4, 2001, which claims the benefit of prior filed U.S. application Ser. No. 60/196,027, filed on Apr. 7, 2000.

BACKGROUND OF THE INVENTION

1. Field of the Invention

The present invention relates to a structure that may be formed of a plurality of resinous cells, a method and an apparatus for forming such a structure. The structure may be formed in place where it is to be utilized.

2. Description of Related Art

In many situations, it may be desirable to form a structure in place where it is to be utilized. Sometimes, a structure is preformed and then assembled in place. One proposed application of such structures is in outer space. For example, it has been proposed to form spacecraft or portions of spacecraft from prefabricated inflatable structures. Prefabricated inflatable structures have also been proposed for forming structures on other celestial bodies, such as moon bases and underground caverns. Such structures have also been proposed for use in terrestrial applications.

Space-based structures that are assembled and/or formed in place can include a plurality of layers of material with various functions. In the context of a spacecraft, the structures can include layers for meteorite resistance, gas retention for inflatable structures, layers for helping the structure to maintain its shape, layers to help retain heat, and/or layers for other functions.

Space based structures have been proposed that are prefabricated and then inflated in space. For example, satellites have been proposed and deployed, which include an inflatable structure. According to one example, the satellite referred to as Explorer XIX, which was launched in December 1963, included a 20 inch inflatable structure. The structure was inflated with gas and included 40 gore plies of preform over a hemispherical mold. The skin was a four-ply laminate consisting of alternating layer so aluminum foil and mylar film, each 0.5 or 0.013 mm thick. The inflatable structure maintained its shape after evacuation of the inflating gas.

Other satellites formed from inflating structures include the ECHO satellites, such as the PAGEOS satellite launched in June of 1966. This satellite included 84 gore plies sealed with adhesive tape. The structure was inflated utilizing a mixture of subliming powders. During ground-based tests, the inflated structure was found to differ from the designed dimensions by less than one-half of one percent. This accuracy was obtained at least in part by utilizing an accurate gore ply pattern, by maintaining seal tolerances and by lowering sealing temperature.

Another proposed use of inflatable structures is as a protective expandable enclosure for astronauts. In particular, an enclosure was built that included a composite wall having an inner three-barrier pressure bladder for gas retention, a four-ply Dacron cloth structural layer, a 2-inch thick polyether foam meteoroid barrier, and a film-cloth laminate outer cover with thermal coating. The expandable composite wall could be structurally bonded to a rigid aluminum honeycomb sandwich floor.

Another example includes an inflatable antenna. The antenna as it has been proposed includes a large, pressurized antennae. In a structure shaped by internal pressure, using a low modulus plastic film, the pressure level decreases with the third power of the linear dimension. As a result, lost inflatant mass would decrease with increasing antenna size. This would make it possible to build low-mass inflatable systems with 5- to 10-year lifetimes. One design incorporates a stabilization torus, with a pressure sufficiently high to warrant the use of a rigidizing structure.

Another proposal includes an inflatable, space-rigidized structure (ISRS). One example of this structure is a 10-m antenna reflector. The antenna consisted of a thin, fiber-reinforced composite lamina. The materials used were a lightweight KEVLAR cloth in an imide-modified, catalytically cured, cycloaliphatic epoxy resin, which may be cured either thermally or by an external gaseous catalyst. The area mass of the resulting composite wall, including a plastic foil gas barrier, was of the order of 0.1 kg/mz.

According to another example, the SOLARES was a 1000 m diameter flat light-reflective membrane stretched by an inflatable toroidal hoop stabilized by tension lines to two masts normal to the membrane at the center. Also, an inflatable antenna has been created that includes a large microwave or light collecting or reflecting dish fabricated using an inflated torus for the rim and either parabolically shaped or spherical shaped plastic membranes attached to the torus. The membranes were stretched to shape by air pressure. The concave surface was metallized to produce the desired microwave reflectivity.

It has been proposed to form a structure by blowing large bubbles in space using self-rigidizing liquids. This would allow the fabrication of large flat structures. Then, self-rigidizing foam could be used to inflate and subsequently rigidize inflatable structures.

As apparent from the above discussion, a number of methods for fabrication of structures in space have been postulated. A number of the proposals have involved inflated structures, clever mechanisms that unfold and lock into position, or polymeric based component systems that can be processed real time. Each has benefits and drawbacks.

Attempts to inflate a structure have been successful in initial deployment, but require a method of maintaining the pressure or stabilizing the structural elements once the gas has been used to position them. Long-term gas supply requires dedicated mission payload capacity. The gas must be maintained in a leak free containment or the structure will collapse. Any gas that does leak or diffuse through the structure over time will be a possible contaminant to sensors and solar cell arrays. This is true even for a structure that only depends on the gas for deployment, not to maintain structural rigidity.

A mechanical approach has been successful in a number of cases, but it is limited to smaller structures due to the inefficiencies inherent in joints, fasteners and sliding surfaces. A number of deployment failures have occurred that were traced to environmental effects, such as thermal expansion and contraction or to tribological effects.

It has also been proposed to fabricate polymeric-based composite structures in space, by pultruding or extruding the materials through a heated processing device. However, the energy requirements for heating can be very taxing on a spacecraft's power system. The residual stresses developed in a composite structure as it is heated during curing and cooled to ambient, and possibly very low, temperatures add complication to the design. Another detrimental factor of such techniques is outgassing of the resin as it is processed. Again, this presents a contamination issue. One approach to get around this issue has been the exploration of using ultraviolet (UV) curing resin systems. The primary drawback to this technology has been the inability to develop a process that allows the resin to be cured with UV while the composite material is being compacted. A composite structure cured with no compacting load will have a substantially reduced performance due to low fiber volume fraction.

Another research path has been the use commercial closed cell foam technology to produce a lightweight rigid structure that expands to shape during processing. Unfortunately, all of the commercial foaming technology produces a gas that can become a contaminant as it diffuses through the polymer. A two component foaming technology is very difficult to control in terms of cell size and cell size distribution throughout a structure's cross-section.

With respect to boom structures utilized in space, boom structures currently are considered to fall into one of the five categories discussed below. The simplest boom structure is based on the use of tension members, typically wire. These structures have limited application, as the spacecraft must be spinning. Centrifugal force deploys and maintains the boom structure.

To date, probably the most common type of boom is the tubular boom. It consist of a thin metallic strip which is spool-wound during storage, but upon controlled release is automatically formed into a tubular shape giving it its stiffness. The tubular boom is, however, limited by its buckling strength at the root.

Another type of boom is the telescoping boom. A telescoping boom is typically shorter but has greater strength than a tubular boom. A telescoping boom is typically deployed using a lead screw or similar type device.

A fourth type of boom employs a series of continuous longerons, which are bent and twisted into a helix for stowage in a cylindrical container. Batten frames are arranged perpendicular to the longerons to provide the required separation, while diagonal cables are used to provide the required shear stiffness. This technology is limited by the amount of strain that can be placed on the longerons in the storage container. Booms of this type have been built in excess of 100 feet long.

The final boom type is similar to the one previously described except it uses articulated longerons instead of continuous longerons. In this type of structure, the longerons are in segments and connected with hinged joints to the batten frames. This approach also utilizes diagonal cables to provide the required shear stiffness.

SUMMARY OF THE INVENTION

The present invention provides a structure that includes a plurality of cells of a cured resinous material. Each cell is joined to at least one other cell.

Additionally, the present invention provides a method of forming a structure. According to the method, a plurality of individual cells are formed. Each cell includes a mass of uncured resin. Some of the cells are contacted with others. The resin is cured.

Furthermore, the present invention provides an apparatus for creating a structure that includes a plurality of cells of cured resinous material. The apparatus includes a plurality of resin flow apertures arranged to permit cells formed at one aperture to contact cells formed at directly adjacent apertures. The apparatus also includes a resin flow control member arranged in each resin flow aperture and operable to control a flow of resin from the resin flow apertures.

Still other objects and advantages of the present invention will become readily apparent by those skilled in the art from a review of the following detailed description. The detailed description shows and describes preferred embodiments of the present invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DESCRIPTION OF THE PREFERRED EMBODIMENT(S)

The present invention can satisfy the need or desire to form structures in place. Additionally, the present invention can fulfill the need to create lightweight high strength structures. In particular, the present invention can be utilized to form elongated lightweight high strength structures. While the present invention may be particularly useful in space, it may be utilized for terrestrial as well as undersea applications.

Structures according to the present invention include a plurality of cells of cured resinous material. The cells may be arranged in a plurality of planes. Each plane may include the same or a different number of cells. The cells may all be aligned with each other in a direction perpendicular to the planes. Alternatively, the cells may be arranged aligned in another direction. For example, the cells in one plane could be arranged with their centers spaced one-half cell diameter away from the cells in an adjacent plane. The cells could be aligned in directions other than in a direction perpendicular to the planes. Also, the cells in one plane may be aligned with each other. In some cases, the cells in one plane or among the planes could be arranged in another pattern. While the cells may be arranged in a variety of patterns, they typically are arranged in a pattern.

Notwithstanding the above, any arrangement of cells may be possible. The description herein is illustrative and not exhaustive. Those of ordinary skill in the art may be able to determine any number of arrangements of cells without undue experimentation once aware of the disclosure contained herein.

The structures according to the present invention that are formed of a plurality of cells may have any desired shape. According to some embodiments, the structures are tubular having any desired cross-sectional shape. The structures could also be solid with any shape. Some embodiments can include a network of cells, such as a beam of crisscrossing lines of cells. The structures can be hollow or solid masses of cells.

Figure 1:
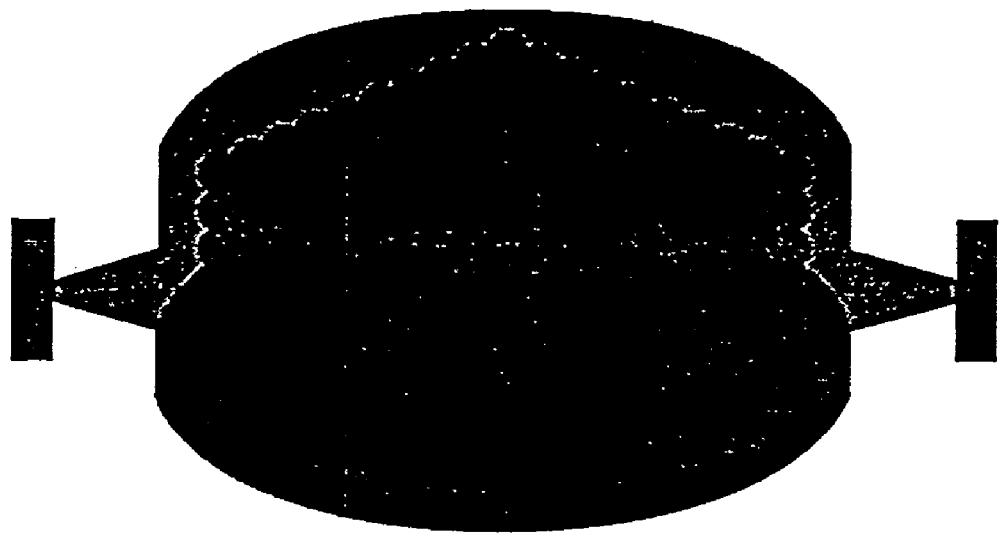
FIGS. 1 and 2 represent perspective views two different embodiments of a structure formed according to the present invention in the process of being formed.
Figure 2:
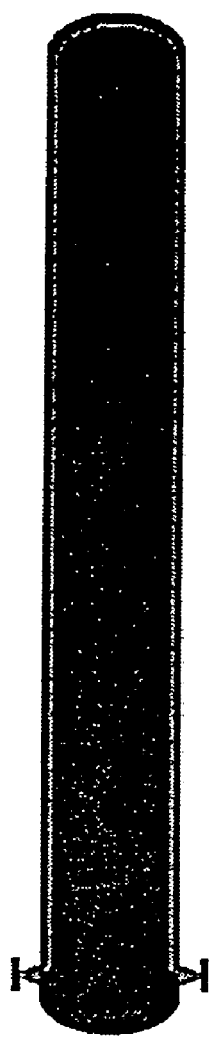
Figure 3:
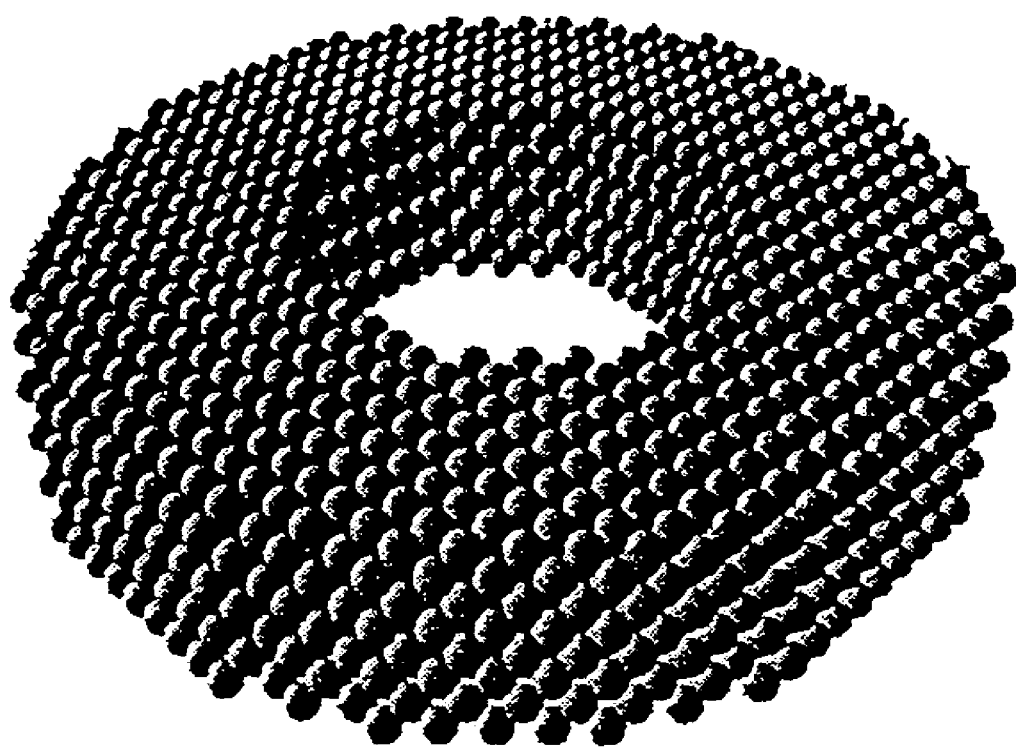
FIGS. 3 and 4 represent perspective views two different embodiments of a structure formed according to the present invention.
Figure 4:
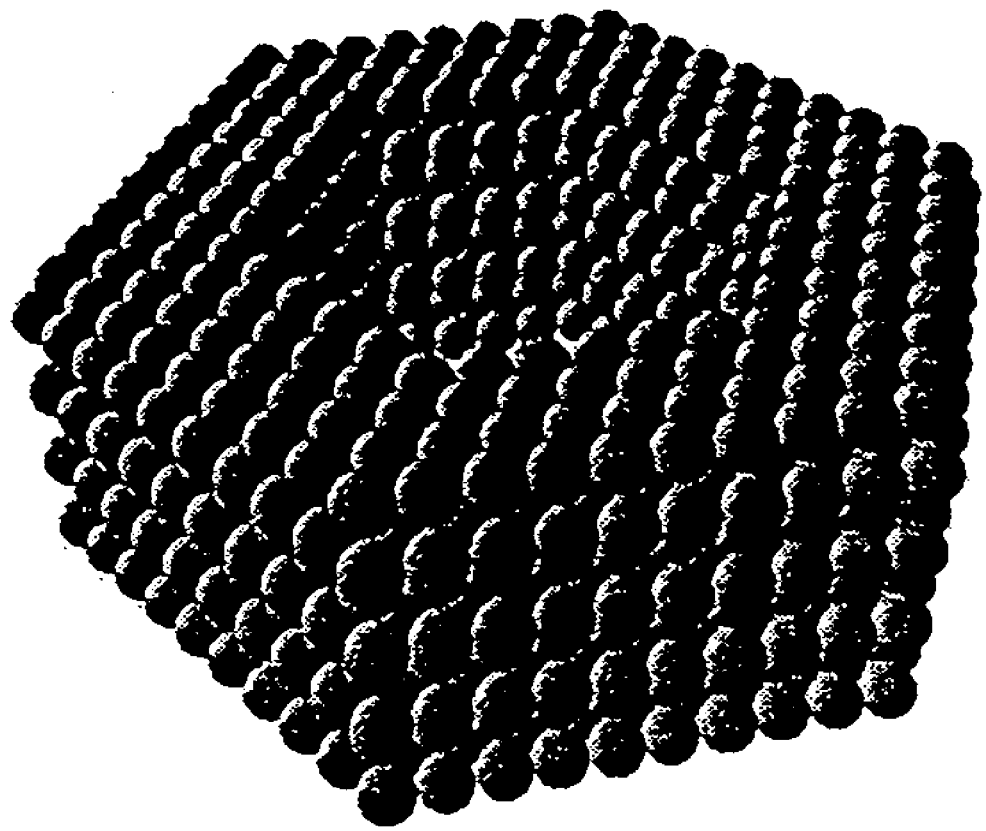

FIGS. 1–4 and 12 illustrate exemplary embodiments of structures according to the present invention. Along these lines, FIG. 1 illustrates a rectangular mass of cells. On the other hand, FIG. 2 illustrates a solid tube of cells. The structures shown in both FIGS. 1 and 2 are in the process of being formed, as described below in greater detail. FIGS. 3 and 4 illustrate two different embodiments of a beam member according to the present invention. Each beam member includes a cylinder of cells. The cylinder shown in FIG. 3 has an inner volume and an outer surface that both have a hexagonal cross-section. On the other hand, the exterior and/or interior surfaces of such structures may have different contours.

Figure 12:
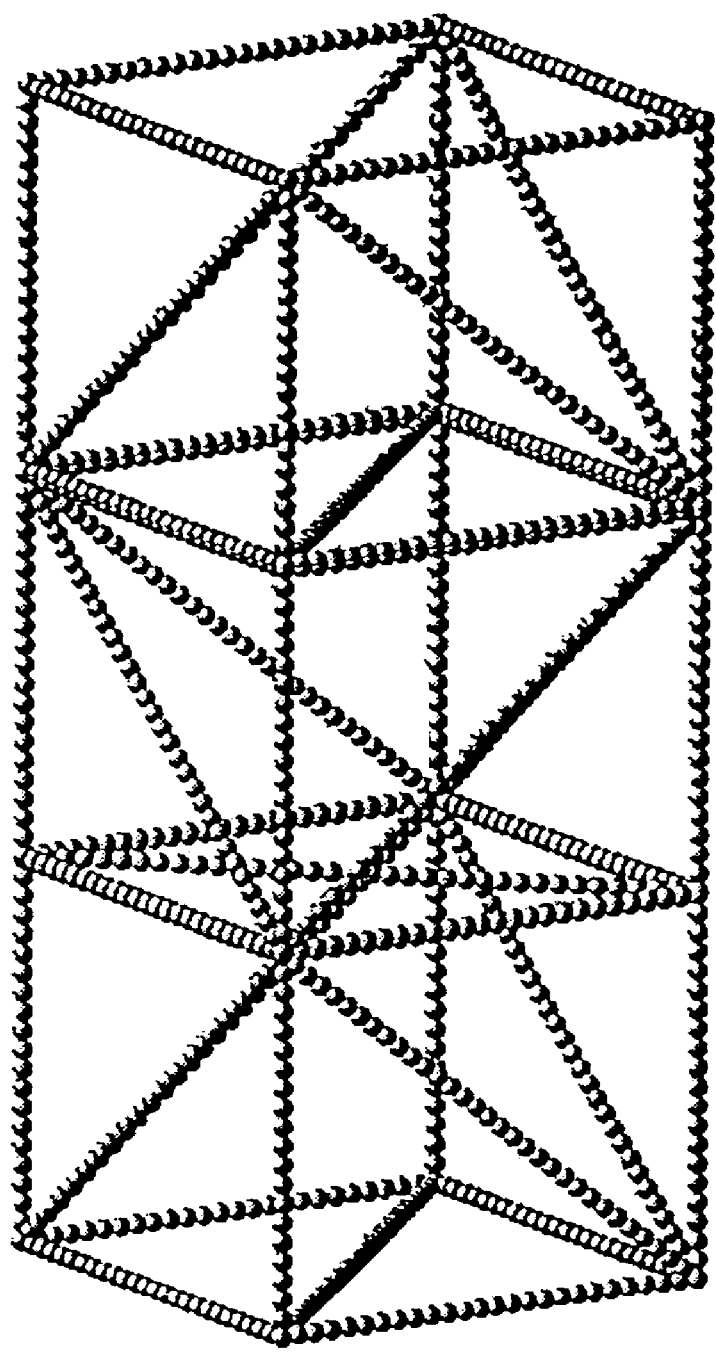
FIG. 12 represents a perspective view of another embodiment of a structure according to the present invention.

Other examples of structures include a solid structure, a hollow tubular structure, a structure with struts at orthogonal angles across the tube, an open grid work like a truss, a helical structure and a cross helical structure. In reality, the structures that may be formed according to the present invention are almost endless. The arrangement of cells to form a structure would be determined and then the cells assembled accordingly. FIG. 12 illustrates such an embodiment. Along these lines, FIG. 12 illustrates an embodiment of a structure according to the present invention that includes a latticework of cells. This embodiment includes a different arrangement of cells from layer to layer.

Cells according to the present invention typically have a generally spherical shape, at least during formation and prior to contacting other cells. However, the cells may have other shapes. In a finished structure, cells could have a generally hexagonal, square or triangular shape. The shape of each cell may at least in part depend upon the relative positions of adjacent cells and the presence or absence of cells in positions adjacent a cell. If a cell abuts another cell it will have a different shape than if no cell is adjacent the cell. The cells on the top, bottom and sides will have a spherical outward-facing contour. On the other hand, if a cell is surrounded on all sides by other cells, the cell could be generally cube shaped. Alternatively, the cell could have a shape with hexagonal sides.

On a side of a cell that does not abut an adjacent cell, the surface of the cell may have a curvature similar to the surface of a sphere. As a result, a structure formed according to the present invention typically will have a bumpy, rounded surface. If necessary, a portion of the fabrication device could be designed to constrain the external dimension of the outermost cells before they are cured, causing their walls to form against a non-stick surface, and thus producing a smooth outer surface. On the other hand, where a first cell abuts against another cell, the first cell may have a more planar contour or a spherical contour indented toward the center of the first cell. Where two cells abut against each other, the cells do not really have a surface since they actually contact each other.

It is important to keep in mind that since the cells abut each other and may contact each other during the formation process, prior to curing, in situations where one cell abuts another, the cells may not be considered to have a surface. Along these lines, the uncured resin from one cell may intermingle with the uncured resin from an adjacent cell during the formation process. In such a case, neither cell may actually have a wall at that point. However, where a cell in the process of being formed contacts an existing cell, then each cell may be considered to have a wall, but the walls are in contact. In some cases, adjacent cells may only contact each other at a single point.

The size of the cells may vary, depending upon the application. In some cases, dense networks of small cells may be more desirable in a structure than utilizing larger cells. For example, the embodiments shown in FIGS. 3 and 4 have walls that include a plurality of small cells. Rather than having walls many cells thick, this embodiment could have a wall one cell thick. Typically, the cells making up a structure all have the same or substantially the same size. However, it is also possible to have different size cells in one structure. One embodiment includes a plurality of larger similarly sized cells arranged in a pattern, with a plurality of smaller cells arranged in a regular pattern to close up spaces among the larger cells. For example, the larger cells could be arranged in a square pattern with smaller cells arranged in the interstices between the larger cells.

The cells according to the present invention may have a variety of internal structures. For example, a cell may have a uniform, or substantially uniform, composition throughout. In other words, the cell may be a solid mass of resin. Alternatively, a cell may include a shell of resin.

If a cell includes a shell of resin, the shell may be filled with another material. The shell could be filled with a fluid, including liquid or gas. Alternatively, the shell could be substantially empty.

In cases where the cell includes a shell, the interior of the shell could have an interior pressure similar to an ambient pressure outside the shell. In space, this could mean that the interior pressure of the cell is quite low. On the other hand, the interior pressure of the cell could be lesser or greater than the ambient pressure surrounding the cell and the structure including the cell. In the event that the shell is filled with gas, the gas could be the same gas utilized to inflate a mass of uncured resin. Alternatively, other gas(es) could be utilized. In underwater applications, the cells could be filled with seawater. One skilled in the art could determine a suitable fluid to fill a cell with as well as an appropriate internal pressure suitable to an application once aware of the disclosure contained herein without undue experimentation.

Resinous materials that may be utilized include commercially available polymers. The type of polymer utilized may vary based upon the desired structural properties of the finished structure. Typically, polymers would be desired that have high stiffness, or modulus, such as for many space-based applications. In some applications, greater flexibility may be desired. Also, polymers that have high strength typically are desirable, such as in many space-based applications. However, in some applications high strength may be less important or desirable.

Another physical property that may be of importance is the coefficient of thermal expansion. In some cases, it would be desired to have a low coefficient of thermal expansion.

In some cases, the propensity of the polymer to release gas that may be utilized to inflate the resin may be important. Along these lines, it may be desirable that the cured resin not release gas at a high rate. This can help to maintain an internal pressure within a cell if the cell has a shell that is filled with gas. In such applications where it is desired for the interior of the cell to have an internal pressure equal to the pressure outside the cell, then the outgassing characteristics can be important.

Another property of the resin that can be important is the coefficient of thermal expansion. If it is desired that the structure have a high degree of thermal stability then it will be desirable for the coefficient of thermal expansion to be low. However, the coefficient may be high. Typically, it is desired for the resin to have a uniform coefficient of thermal expansion. This can help to eliminate deformation of a structure formed with the cells as the cells undergo heating and cooling.

The environmental durability of the cured resin may be taken into consideration. Typically, it is desirable for the cured resin to have a high resistance to degradation by environmental elements, such as, for example, radiation, temperature, impact from particles. In different applications, different factors may be of greater or lesser importance. For example, in space, radiation and particle resistance may be of paramount importance. On the other hand, in an underwater application, resistance to the corrosive nature of seawater may be significant.

Other factors that may be of importance to selecting a resin can include moisture or biological growth resistance, electrical conductivity, electrical insulation, RF transparency, optical properties, chemical susceptibility, and/or other properties.

In some cases, the properties of the resin when uncured may also be of importance. Among the characteristics that can be considered are viscosity, surface tenacity, cure rate and/or others. In some cases, the ease with which the uncured resin may be stored and handled may be important.

Another factor that may be important in identifying polymers to utilize can include the type energy required to cure the polymers. For example, in space-based applications, where ultraviolet radiation is abundant, resins cured with ultraviolet radiation may be the most desirable. In other cases, thermosetting resins may be desirable.

The structure of a cell may also influence the resin utilized. For example, if the cells are to include a shell, then it may be particularly important to select a resin that will permit the formation of repeatable dimension stable cells.

In the particular example of a truss or strut for use in a space structure, UV cured epoxies may work better than other resins. Other resins that could be utilized in a space-based application include polyurethanes, acrylics, and silicones, particularly UV cured examples of each of these. However, it is important to understand that the discussion herein only provides examples of factors that may be considered in selecting a resin for use in a structure according to the present invention. Other factors may alternatively or additionally be considered in selecting a resin. Those of ordinary skill in the art, once aware of the disclosure contained herein would be able to determine an appropriate resin or mixture of resins with required properties without undue experimentation.

The type of resin utilized may also take into account the process utilized for forming a cell according to the present invention. A method for forming a structure according to the present invention includes forming a plurality of individual cells each including a mass of uncured resin. The cells may be formed in planes, with each cell in a plane being formed at about the same time. Alternatively, whether formed in planes or not, the cells may be formed individually at different times. When the cells are formed can depend at least in part upon the apparatus utilized to form the cells.

Some of the cells are contacted with some of the other cells. Which cells are contacted with which others will depend at least in part upon the type of structure that is being formed. Along these lines, in a structure that includes a solid mass of cells, such as the structure shown in FIG. 1, most cells will contact many other cells. On the other hand, if the structure is a strut, many cells will contact fewer other cells.

After forming the masses of resin, the resin is cured. The curing may be carried out by exposing the resin to whatever type of energy cures the resin. In some cases, where the masses are formed in planes, each mass in a plane may be cured at the same time. Alternatively, the masses may be formed and cured at different times.

As the masses are formed, they may be formed in the shape of a sphere. In embodiments that include solid cells of resin, the resin may be formed as a mass.

Alternatively, where the cells include a shell, a mass of resin may be formed. The mass may then be inflated by injecting fluid into the mass of resin. Depending upon the embodiment, the fluid may be liquid or gas. An amount of liquid sufficient to inflate the resin mass to a desired size in injected into the resin masses. Typically, the gas will not react with the resin and/or the curing process. Examples of such gasses can include nitrogen, argon, helium and/or any other gas that is non-reactive with the resins or the curing process. However, if the gas is needed in the curing process, for example to catalyze or as a reactant, then other gases may be utilized. For example, hydrogen or oxygen could be utilized in such an embodiment. Such gases may also be utilized if it were desired to create an explosive structure. If the fluid is a liquid, then the fluid could be solidified after injection. In some embodiments, one fluid is utilized to inflate the masses of resin and another fluid is injected into the cured cell. In such embodiments, the fluid utilized to inflate the resin mass is evacuated from the resin mass after inflation and curing or the resin.

In embodiments of structures described above that include planes of cells, the structures may be formed one plane at a time. As each plane is formed, it is joined to the plane formed just prior. Cells in each plane are contacted with the cells in an adjacent plane as needed to form the desired structure. As described above, the cells in adjacent planes may be arranged in a line perpendicular to the planes. Alternatively, the cells in adjacent planes may be arranged in a line inclined with respect to a line perpendicular to the planes.

The planes may be formed with the same number or a different number of cells. Some cells in a structure may have the same number of cells in some planes and different numbers in other planes. The masses of resin are created and cured until the desired structure is formed.

The present invention also includes an apparatus for forming a structure according to the present invention. Other apparatuses may also be utilized to form a structure according to the present invention.

An apparatus according to the present invention includes a plurality of resin flow apertures. The resin flow apertures are arranged to permit cells formed at one aperture to contact cells formed at adjacent apertures. A resin flow control member is arranged at each resin flow aperture to control the flow of resin from the resin flow aperture.

The resin flow control member could include any suitable valve that can control the flow of resin. The opening and closing of the resin flow control member is controlled to permit an amount of resin to flow out that is sufficient to form what ever size cell is desired.

If it is desired that the cells according to the present invention include a shell rather than a solid mass of resin, then an apparatus according to the present invention may also include a fluid injection port to inject fluid into the uncured resin. By injecting fluid into the resin, the mass of resin may be inflated. Flow of fluid through the fluid injection port and into the uncured resin may be controlled by a fluid flow control member. The fluid flow control member may be any fluid flow control member suitable to control the flow of a fluid. As described above, the fluid may be gas or liquid. If the fluid is a gas, then any valve or other member capable of controlling the flow of gas could be utilized. Similarly, if the fluid is a liquid, then any valve or other member could be utilized to control the flow of liquid. When a sphere is formed the surface tension tends to either keep expanding the sphere if the material allows or to fail the sphere as it reaches the tensile strength of the membrane formed.

The fluid flow control member can control flow of fluid into and out of the cell, as described above. Along these lines, if it is desired to equalize the pressure of the interior of the cell with the ambient pressure outside of the cell, then the fluid flow control member could control the flow of fluid out of the cell. Additionally, if another fluid is introduced into the cell after curing, then the fluid flow control member can control the flow of fluid back into the cell.

To form embodiments of the present invention that include a plurality of cells arranged in planes, the resin flow apertures may be arranged in a forming plate. Such a plate can include a plurality of fluid flow apertures arranged in any pattern. Some embodiments may include resin flow apertures arranged in concentric circles. Other embodiments can include resin flow apertures arranged in a rectangular grid. Any desired arrangement of resin flow apertures may be utilized. If the pattern of holes that generate individual cells is switched on and off in various geometric patterns, different morphology structures can be formed.

Figure 5:
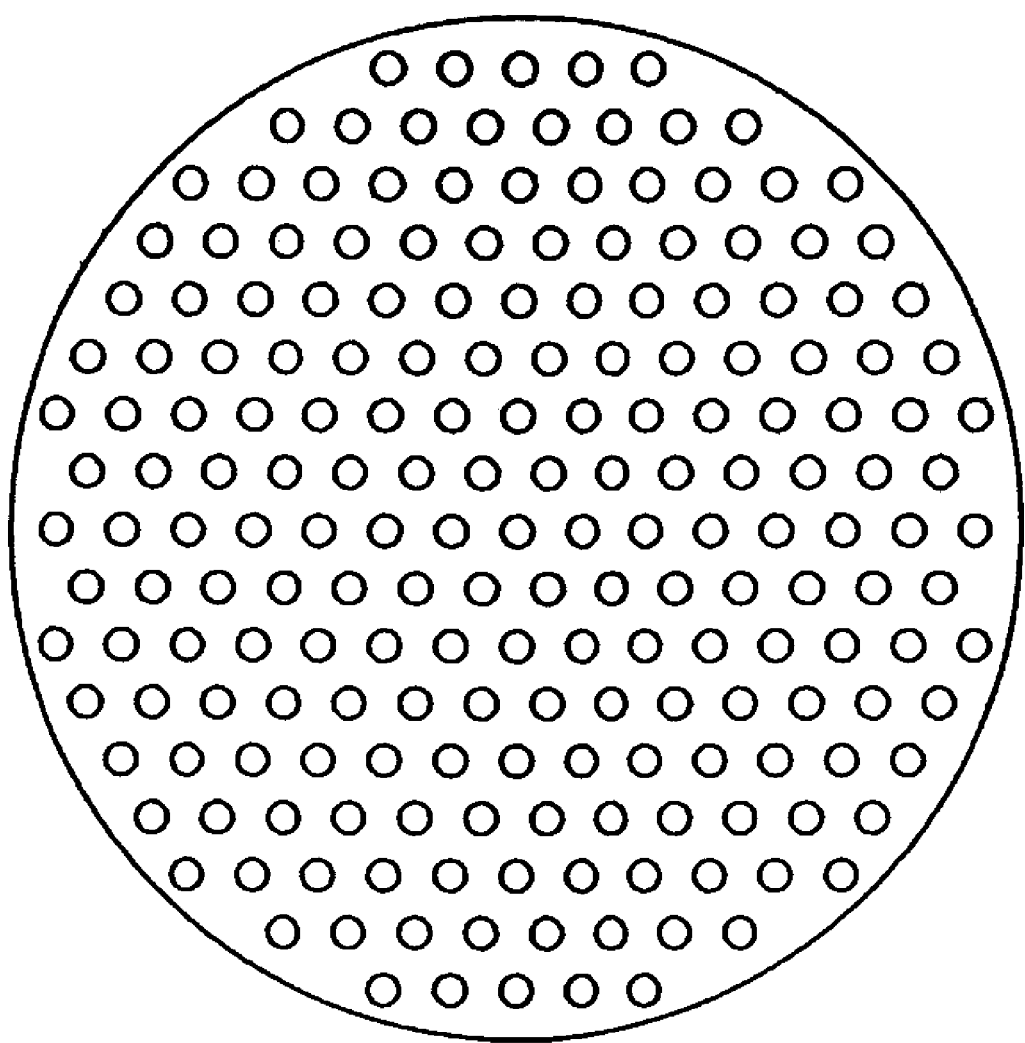
FIG. 5 represents an overhead view of an embodiment of a forming plate according to the present invention.

FIG. 5 illustrates an embodiment of a forming plate according to the present invention. Along these lines, FIG. 5 illustrates a forming plate 1 that includes a plurality of resin flow apertures 3. The resin flow apertures are arranged in a hexagonal grid.

To form a structure, flow of resin may be turned on and off in the resin flow apertures in the plate. For example, if a beam including a skeleton of members were being formed, some times, resin might flow out of only three or four of the apertures that would be arranged at the corners of the beam and a few apertures arranged in the center of the beam to form interior skeletal members. To form a cylindrical shape such as that shown in FIGS. 3 and 4, a ring of apertures would be permitting resin to flow to form the wall of the structure, with all other apertures being closed off entirely during the entire process of forming the structure. Of course, resin would only periodically flow from the apertures as each plane is formed.

Some embodiments of an apparatus according to the present invention include resin flow apertures with positions that are alterable. Such apertures may not be formed in a plate. However, the position of the plate may be altered to alter the position of the resin flow apertures, as well. This can permit a desired cell pattern to be produced as well. Even if the position of the resin flow apertures is alterable, the flow of resin may be controlled to flow from only selected apertures.

The resin flow apertures may all have the same diameter. This can permit the apparatus to form cells of resin having the same diameter. Alternatively, the apertures may have different diameters. In some cases, the diameter of the resin flow apertures may be varied to permit the apparatus to form different size cells.

According to an embodiment that includes a forming plate that includes a plurality of resin flow apertures, a resin flow control member may be arranged at each aperture. The resin flow control members may be controlled to generate the desired resin flow pattern.

Figure 6:
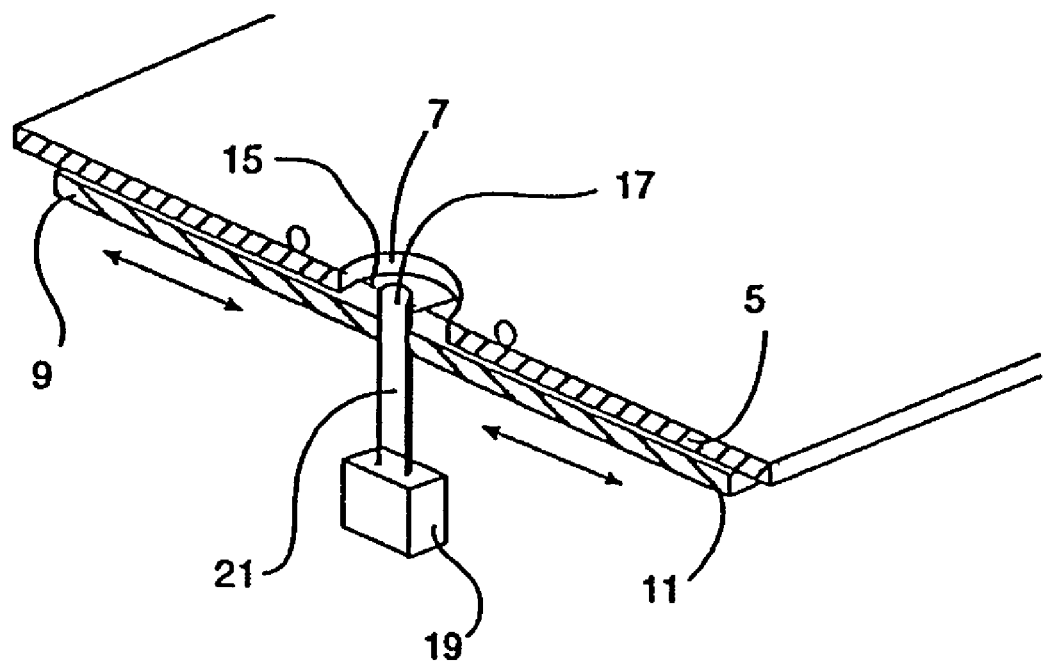
FIG. 6 represents a cross-sectional view of an embodiment of a resin flow aperture, resin flow control member, fluid flow aperture and fluid flow control member according to the present invention.

FIG. 6 illustrates an embodiment of a resin flow control member that may be included in a forming plate. Along these lines, FIG. 6 illustrates a portion of a forming plate 5. A resin flow aperture 7 extends through the forming plate 5.

This embodiment of a resin flow control member includes a shutter plate. The shutter plate includes two elements 9 and 11. Resin 13 is arranged in an area beneath the shutter plates. The shutter plates may be moved laterally in the view shown in FIG. 6 to permit resin to flow out of the resin reservoir located beneath the shutter plates. The broken line 15 indicates resin flowing from the resin flow aperture. The resin reservoir may be pressurized to cause the resin to flow out of the resin reservoir. After a sufficient amount of resin has flowed out of the resin flow aperture, the shutter plates maybe moved laterally to close off the flow of resin.

The embodiment shown in FIG. 6 may be utilized to form cells that include a shell of cured resin. Along these lines, the embodiment includes a fluid injection port 17. A fluid flow control member 19 is arranged in a fluid supply line 21. Fluid may be injected into the resin as the resin flows out of the resin flow aperture. Alternatively, the fluid may not be injected into the resin until all of the resin has flowed out of the resin flow aperture and the flow of resin has been cut off.

The amount of gas needed to inflate the resin cell depends upon the amount of resin and the desired size of the inflated cell. In embodiments that produce uniform size cells, the amount of gas could be controlled to always be the same, as could the amount of resin flowing from the aperture. This could permit a structure to be more easily, quickly, and cheaply formed.

Although the fluid injection port is arranged adjacent the resin flow aperture, it may be arranged in any location that permits the fluid to be injected into the resin as it flows out of the resin flow aperture. Typically, the fluid injection port is located to inject fluid into the resin on a side of the resin cell that faces the next plane of cells.

As described above, the fluid that may be injected to inflate the resin may be withdrawn. Withdrawing the fluid may be carried out for a variety of reasons. Withdrawing the inflating fluid may be carried out to equalize the pressure within a cell to the ambient pressure outside the cell. The fluid may also be withdrawn to conserve the inflating fluid that might be lost to the environment. Such would typically be the case in space-based applications. Also in space-based applications, withdrawing an inflating gas can serve to prevent diffusion of the gas out of the cell structure and subsequent condensation back onto cold surfaces on a spacecraft, its solar cells or instruments. Also, in a space-based application, reuse of the inflation gas will minimize the mass and volume of materials needed to construct a structure according to the present invention in space. This can result in lower costs and free up payload capacity for other functions, instead of gas that will be thrown away.

Figure 7:
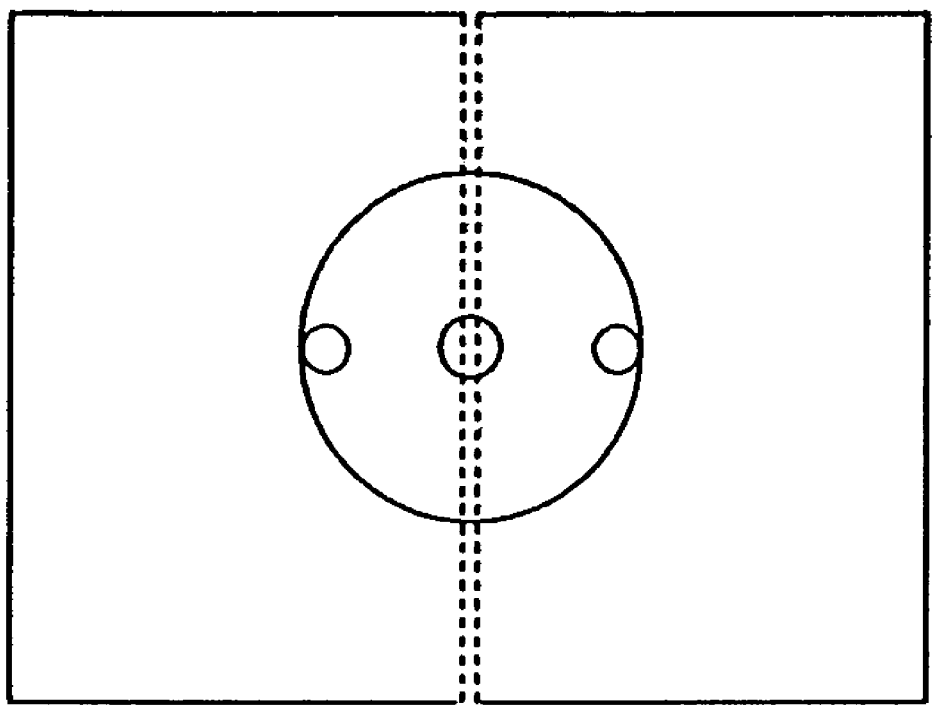
FIG. 7 represents an overhead view of the embodiment illustrated in FIG. 6.

FIG. 7 illustrates an overhead view of the embodiment shown in FIG. 6.

Other arrangements are possible for the resin flow control and fluid flow control. Along these lines, the present invention could include an iris valve to control the flow of resin. The resin and inflating fluid could flow through nested or concentric tubes or nozzles. Any other suitable dispensing mechanism could also be employed.

The thickness of the wall produced by injecting a fluid into a resin may depend at least in part upon the viscosity of the resin. Utilizing a resin having a known viscosity that maintains a film when inflated into a "bubble", the wall thickness of the bubble will be determined by a balance of forces. The gas pressure outward, the viscosity of the resin resisting flow, the effect of gravity or any other inertial effect pulling on the resin mass, and the time over which it can flow. Typically, it would be desired to quickly inflate and cure the resin before the bubble walls can thin out or develop a thickness gradient from top to bottom. In space this would not be as big of a problem, although studies of bubbles in weightlessness have still shown a movement of material in a bubbles wall based on surface tension differences from point to point.

Figure 8:
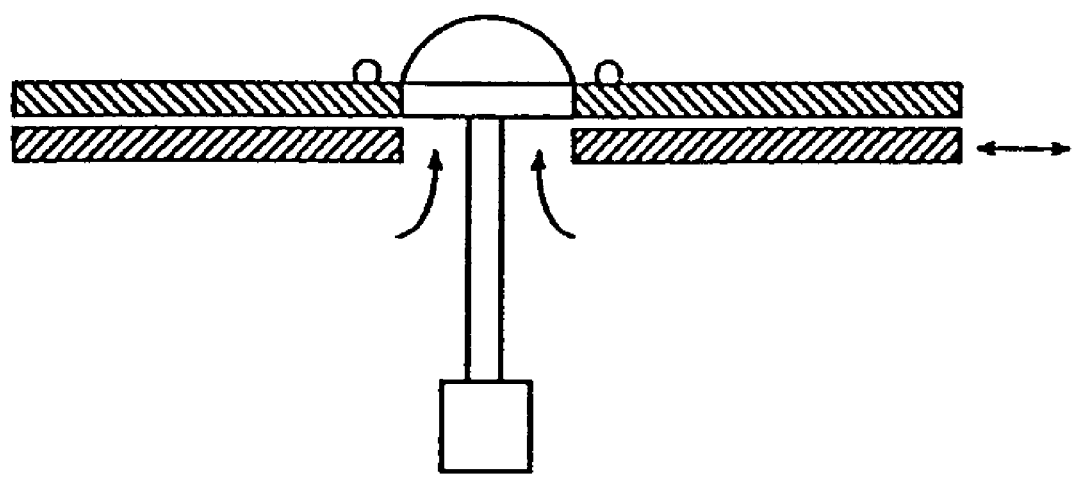
FIGS. 8–10 represent cross-sectional views the embodiment of the apparatus illustrated in FIGS. 6 and 7 at various stages of an embodiment of a process according to the present invention.
Figure 9:
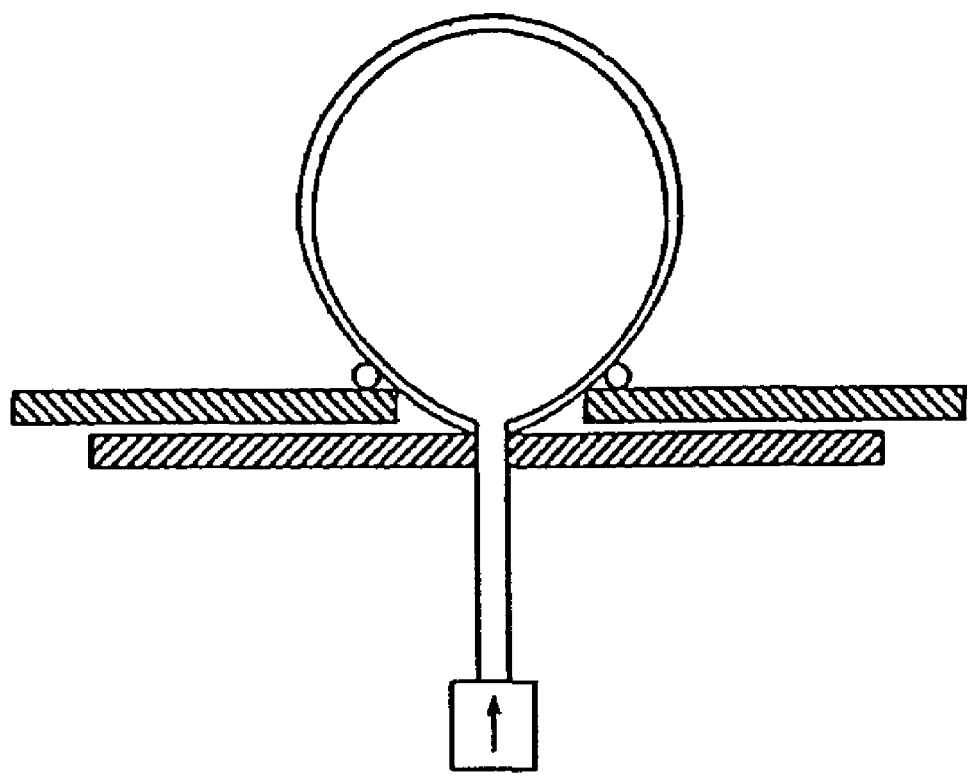
Figure 10:
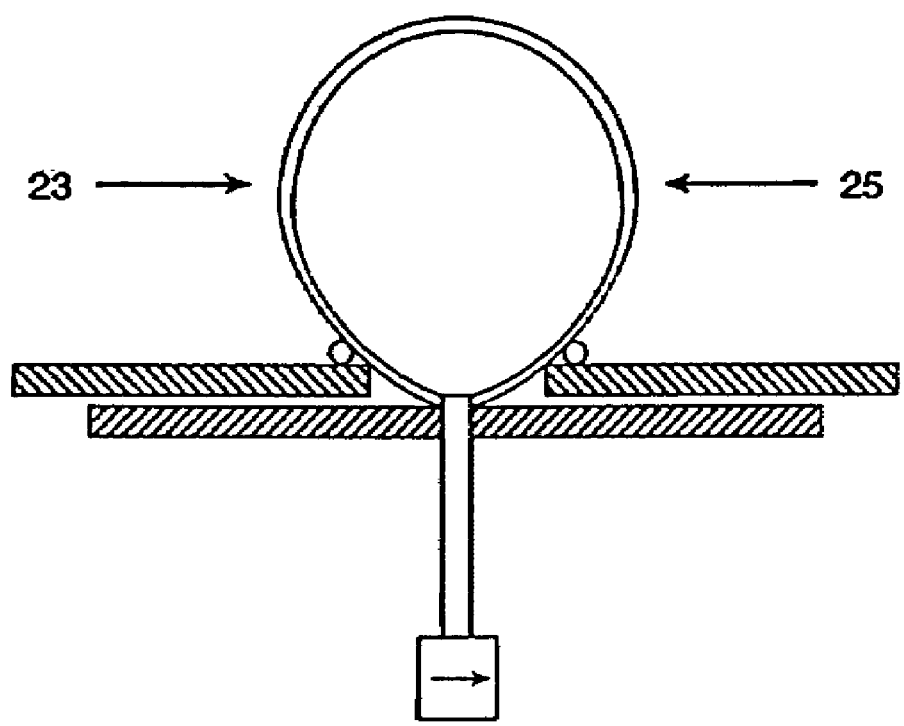

FIGS. 8–10 illustrate the embodiment shown in FIGS. 6 and 7 at various stages of the formation of a cell that includes a shell of cured resin. Along these lines, FIG. 8 shows the shutter valve as it has moved laterally to initiate the flow of resin. In FIG. 9, the shutter valve has closed and the fluid has been injected into the resin to inflate the resin. In FIG. 10, the resin has been inflated a desired amount and energy to cure the resin impacts on the resin, as indicated by arrows 23 and 25.

In space, the sun could act as the source of energy to cure the resin, if the resin is cured by the available wavelength(s) of ultraviolet radiation. Alternatively, a source of curing energy could be included in the apparatus. While the resin may be self-curing, if it requires energy to be cured, the energy source could produce whatever type of energy is required. As described above, the resin could be cured by heat, visible light, electron beam, microwave or other form of energy.

In embodiments that include a source of curing energy, the apparatus could include a source of curing energy. The source of curing energy could be located where ever it would be effective. For example, a UV light distribution system could be arranged above the opening either on the surface of the plate or built into the plate between the resin flow apertures. The UV light distribution system could include, for example, fiber optic or light pipes arranged in patterns to distribute the curing light to all of the surfaces of a just formed cell. FIGS. 8–10 illustrate an embodiment of an apparatus according to the present invention that includes a source of curing energy 31 arranged on the surface of the forming plate. The energy source shown in FIGS. 8–10 includes a distribution light pipe for supplying UV curing energy. Such an energy source can permit distribution of energy to each cell, independent of the size of the structure and/or the cells. This can address problems associated with supplying curing energy equally to all cells as the cross-sectional size of a structure grows. A variation of this embodiment features the curing energy source that is integral to the plate surface.

Figure 11:
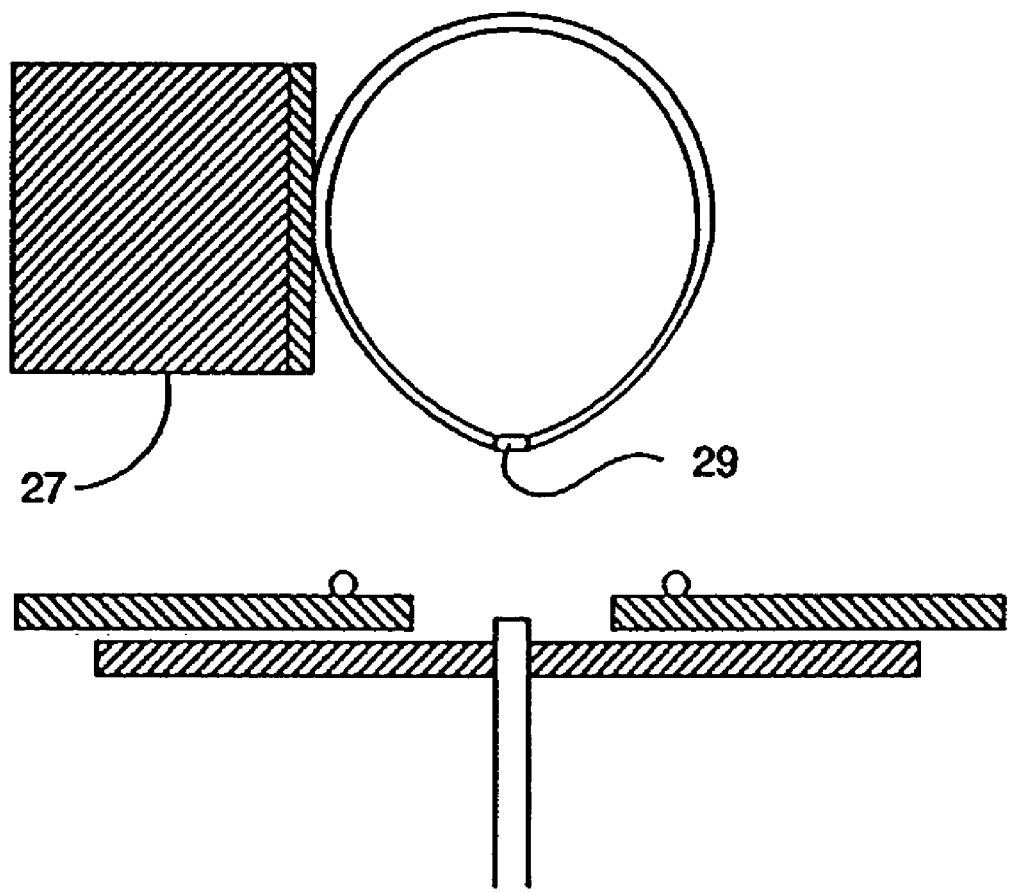
FIG. 11 represents a cross-sectional view of an embodiment of a cell-retaining member according to the present invention.

After curing the resin, the forming plate may be moved away from the cured resin cells a distance of about one cell thickness. This can permit the next plane of cells to be formed and to contact the preceding layer of cells. To facilitate formation of the structure, an apparatus according to the present invention can include one or more cell retaining elements to retain the cells after curing and as the forming plate moves one cell layer away. FIG. 11 illustrates an embodiment of a cell-retaining element 27. Any variety of means could be utilized to retain the cells. For example, a vacuum could retain a cell to a cell-retaining element.

FIG. 11 also illustrates a hole in the resin cell 29 that may remain from the withdrawal of the fluid flow port from the resin cell after curing. The succeeding layer of cells can seal that hole. The process could be controlled to cause additional resin to flow into the hole to seal it to help ensure that little or nothing flows into or out of the cell as the fluid injection line is withdrawn from the cell. This would typically be carried out at least with the cells of a final plane of a structure and cells that do not have an adjoining cell in directly succeeding plane of cells.

When forming a structure according to the present invention, it may be desired to impart a particular contour to surfaces of cells that do not contact adjacent cells. For example, it may be desired that the exterior of a structure built of cells have a smooth contour. An embodiment of a device according to the present invention could include one or more elements for imparting a desired contour to the cells as they are formed before the resin is cured. For example, a device could include one or more elements that would define an outermost extent of a structure to be formed. For example, as the device could include an element having a cell-engaging surface at each location where a cell could be formed. As the cells of resin are formed, they would come into contact with the surface. As the resin contacts the ring, the surface of the resin cell would take on the contour of the cell. The surface(s) could be movable so that where ever it is desired that a cell have the desired contour, the surface could be moved. One embodiment could include a ring that would define the outermost extent of a structure to be formed. Other embodiments could include one or more plates, pads, and/or other elements.

The surface(s) could be coated with a material to help prevent the resin from sticking. For example, the surface(s) could be coated with a fluoropolymer. One example of a fluoropolymer is polytetrafluoroethylene or TEFLON. Any suitable material could be utilized to help prevent the resin from sticking to the surface(s).

If it were desired that the structure have a curved surface, then a device according to the present invention could include a ring that has a curved surface that faces the resin cells. On the other hand, if it were desired that the exterior of a structure include a plurality of flat surfaces, such as the structure shown in FIG. 3, then the ring could include a similar number of flat surfaces. The ring or other surfaces could have any desired contour.

During the formation of cells, a contour forming surface(s) could be positioned in a desired orientation(s) relative to the cell(s) adjacent where cells are to be formed, such as in the vicinity of the forming plate described herein. The resin could then be expelled from the resin flow apertures in the forming plate. As resin is fed through the aperture, it will contact the contour forming surface and as more resin is fed or the resin is inflated, the surface of the resin that contacts the contour forming surface will take on the contour of the surface. By utilizing one or more contour forming surfaces, a smooth or less bumpy surface can be imparted to the cells. The contour forming surface(s) could then be moved to a position contact subsequent layers of cells, if desired.

Figure 13:
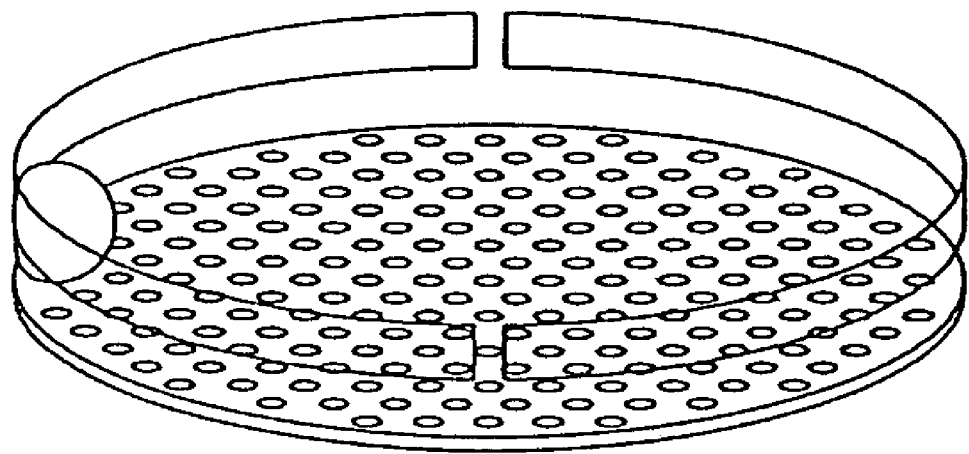
FIG. 13 represents a perspective view of an embodiment of a device that includes an embodiment of a contour forming surface according to the present invention.

FIG. 13 illustrates an embodiment of an apparatus that includes contour-forming elements. The contour-forming elements include two semi-circular rings 31 and 35. As can be seen in FIG. 13, as a resin cell increases in size, the outer most portion of its surface will contact the contour-forming elements and, as a result, the outer surface of the cell will take on the contour of the contour-forming elements.

FIGS. 1 and 2 illustrate two embodiments of a structure during an embodiment of a process for forming the structure and utilizing an embodiment of an apparatus. Along these lines, FIGS. 1 and 2 illustrate two radiation sources 2 and 4 that each produce radiation 6 and 8 to act on the structures 10 and 16 as they are formed. FIGS. 1 and 2 also illustrate a forming plate 12. Indexing or manipulating device 14 can move the cured structure away from the fabrication surface of the orifice or forming plate or retain the structure as the orifice plate moves away from the structure.

It is not necessary that an indexing or manipulating device extend entirely along a structure. The indexing or manipulating device could include an annular collar that is located near the plate and surrounds the structure being fabricated. As discussed above, other embodiments of an indexing or manipulating device are also possible.

A few significant advantages of the present invention include that they can produce a very light weight structure with adequate buckling and bending properties to accommodate structural loads. Due to use of a small reusable pressurization system and minimal mass of the polymers used the payload weight can be dramatically reduced over that of deployable bags or other systems. The present invention can also produce a structure with a compressive wall stiffness exceeding that of typical collapsible inflated structures. Also, an inflated structure's wall material can become creased or permanently deformed where it was folded for storage before deployment, thereby reducing its column buckling load capability. The present invention can be applied to space structures including platforms, arrays and antennas.

The present invention can be utilized for ultra-lightweight boom structures for space in proposed ultra-lightweight structures and space observatories. Along these lines, the present invention can be utilized to form boom structures in space that are very lightweight and still have high buckling strength area. The present invention can be adapted to specific requirements for deployable boom structures that take up a minimum of space and can be easily deployed, while having high buckling strength. This is at least in part facilitated by a processing technique that will permit deployment/extrusion of a structure and curing in-situ. Significantly, the present invention can be applied to other space structures, such as the construction of space stations or the fabrication of space colonies on other worlds.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. An apparatus for creating a structure comprising a plurality of cells of cured resinous material, the apparatus comprising:
    a plurality of resin flow apertures arranged to permit cells formed at one aperture to contact cells formed at directly adjacent apertures, wherein a position of the resin flow aperture is alterable;
    a resin flow control member arranged in each resin flow aperture and operable to control a flow of resin from the resin flow apertures, wherein the resin flow control member comprises a shutter valve;
    a liquid injection port arranged in each resin flow aperture for injecting liquid into a cell of uncured resin flowing out of the resin flow aperture to inflate the cell;
    a liquid flow control member operable to control a flow of liquid through the port;
    wherein the liquid comprises a gas or a fluid;
    a forming plate that the resin flow apertures are formed through;
    at least one cell-retaining member for retaining the cells after curing of the resinous material; and
    a source of energy for curing the uncured resin, wherein the energy source comprises at least one of a source of ultraviolet radiation, a heat source, a source of visible light, an electron beam source, and a source of microwave radiation,
    wherein the apparatus-formed cells have a substantially uniform size.

* * * * *